(12) United States Patent
Prechtl et al.

(10) Patent No.: US 12,427,656 B2
(45) Date of Patent: Sep. 30, 2025

(54) ROBOT SYSTEM FOR TESTING A LOADING SPACE OF A LOADING AID IN A STORAGE AND ORDER-PICKING SYSTEM AND OPERATING METHOD THEREFOR

(71) Applicant: TGW Logistics GmbH, Marchtrenk (AT)

(72) Inventors: Christian Prechtl, Voecklabruck (AT); Harald Schroepf, Wels (AT)

(73) Assignee: TGW Logistics GmbH, Marchtrenk (AT)

( * ) Notice: Subject to any disclaimer, the term of this patent is extended or adjusted under 35 U.S.C. 154(b) by 487 days.

(21) Appl. No.: 16/978,311

(22) PCT Filed: Mar. 7, 2019

(86) PCT No.: PCT/AT2019/060078
§ 371 (c)(1),
(2) Date: Sep. 9, 2020

(87) PCT Pub. No.: WO2019/169420
PCT Pub. Date: Sep. 12, 2019

(65) Prior Publication Data
US 2021/0046646 A1    Feb. 18, 2021

(30) Foreign Application Priority Data
Mar. 9, 2018  (AT) ............... A 50208/2018

(51) Int. Cl.
*B25J 9/16* (2006.01)
*B25J 13/08* (2006.01)
(Continued)

(52) U.S. Cl.
CPC ........... *B25J 9/1612* (2013.01); *B25J 9/1615* (2013.01); *B25J 9/1687* (2013.01); *B25J 13/08* (2013.01);
(Continued)

(58) Field of Classification Search
CPC ...... B25J 9/1612; B25J 9/1615; B25J 9/1687; B25J 13/08; B25J 15/0616; B25J 9/0093;
(Continued)

(56) References Cited

U.S. PATENT DOCUMENTS 4,242,025 A   12/1980 Thibault
5,564,893 A   10/1996 Tacchi et al.
(Continued)

FOREIGN PATENT DOCUMENTS

AT       511 867 A1      3/2013
CN       201711969 U     1/2011
(Continued)

OTHER PUBLICATIONS

Monkman, Gareth J. et al., "Robot Grippers" Weinheim: Wiley-VCH Verlag GmbH & Co. KGaA, 2007.
(Continued)

*Primary Examiner* — Adam R Mott
*Assistant Examiner* — Byron Xavier Kasper
(74) *Attorney, Agent, or Firm* — Collard & Roe, P.C.

(57) ABSTRACT

A robot system includes a robot having a gripping unit for gripping goods and a sensor system for detecting a loading space of a loading aid and the goods stored therein. After the gripping of a good, a check is conducted using a controller on whether a good protrudes beyond the loading space. If necessary, the good protruding beyond the loading space is gripped and placed at a different position, or the part of the good protruding beyond the loading space is moved into the loading space. Moreover, a method operates the robot system.

35 Claims, 7 Drawing Sheets

(51) Int. Cl.
*B25J 15/06* (2006.01)
*B65G 1/137* (2006.01)

(52) U.S. Cl.
CPC ........ *B25J 15/0616* (2013.01); *B65G 1/1376* (2013.01)

(58) Field of Classification Search
CPC ...... B25J 9/1697; B25J 9/1679; B25J 9/1664; B25J 5/00; B25J 5/007; B25J 5/02; B25J 9/0096; B65G 1/1376; B65G 1/1378; B65G 1/1373; B65G 47/90; B65G 61/00; B65G 1/137; B65G 1/0492; B65G 43/08; B65G 1/1375; G05B 2219/40053; G05B 2219/40078; G05B 2219/39106; G05B 2219/40025; G06Q 10/087; Y10S 901/02; Y10S 901/47; G05D 2201/0216
See application file for complete search history.

(56) References Cited

U.S. PATENT DOCUMENTS

| | | | |
|---|---|---|---|
| 5,605,432 A | 2/1997 | Fink et al. | |
| 6,681,151 B1 | 1/2004 | Weinzimmer et al. | |
| 8,788,086 B2 | 7/2014 | Franz | |
| 9,026,243 B2 | 5/2015 | Radwallner et al. | |
| 9,205,558 B1 | 12/2015 | Zevenbergen et al. | |
| 9,381,645 B1 | 7/2016 | Yarlagadda et al. | |
| 9,452,894 B2 | 9/2016 | Puchwein et al. | |
| 9,457,477 B1 | 10/2016 | Rublee et al. | |
| 9,665,946 B2 | 5/2017 | Oda | |
| 9,751,693 B1 | 9/2017 | Battles et al. | |
| 9,827,677 B1 | 11/2017 | Gilbertson et al. | |
| 9,868,207 B2 | 1/2018 | Wellman | |
| 9,926,138 B1 | 3/2018 | Brazeau et al. | |
| 9,950,863 B2 | 4/2018 | O'Brien et al. | |
| 10,108,194 B1 | 10/2018 | Russell | |
| 10,549,928 B1 | 2/2020 | Chavez et al. | |
| 10,625,305 B2 | 4/2020 | Wagner et al. | |
| 10,773,839 B1* | 9/2020 | Talda | B65B 61/28 |
| 10,926,408 B1 | 2/2021 | Vogelsong et al. | |
| 10,981,272 B1* | 4/2021 | Nagarajan | B25J 9/1669 |
| 11,514,386 B1* | 11/2022 | Soles | G06Q 30/0635 |
| 11,858,743 B2 | 1/2024 | Bauman et al. | |
| 2005/0226711 A1 | 10/2005 | Schnoor et al. | |
| 2006/0182545 A1 | 8/2006 | Ray et al. | |
| 2006/0185228 A1 | 8/2006 | Korte et al. | |
| 2006/0185229 A1 | 8/2006 | Korte et al. | |
| 2008/0181753 A1 | 7/2008 | Bastian et al. | |
| 2009/0279999 A1 | 11/2009 | Faulkner et al. | |
| 2010/0221094 A1* | 9/2010 | Kuehnemann | B65G 61/00 414/800 |
| 2011/0170998 A1 | 7/2011 | Winkler | |
| 2011/0264259 A1 | 10/2011 | Boyer et al. | |
| 2013/0041495 A1 | 2/2013 | Moore et al. | |
| 2014/0023461 A1 | 1/2014 | Schaller et al. | |
| 2014/0205403 A1* | 7/2014 | Criswell | B65G 67/24 414/809 |
| 2014/0234066 A1 | 8/2014 | Mathi et al. | |
| 2014/0244026 A1 | 8/2014 | Neiser | |
| 2015/0057793 A1 | 2/2015 | Kawano | |
| 2015/0314439 A1 | 11/2015 | Wang et al. | |
| 2015/0336741 A1 | 11/2015 | Ahammer et al. | |
| 2015/0346708 A1 | 12/2015 | Mattern et al. | |
| 2015/0370239 A1* | 12/2015 | Pronold | G05B 19/402 700/214 |
| 2016/0009493 A1 | 1/2016 | Stevens et al. | |
| 2016/0016311 A1 | 1/2016 | Konolige et al. | |
| 2016/0207195 A1 | 7/2016 | Eto et al. | |
| 2016/0236867 A1* | 8/2016 | Brazeau | B25J 5/007 |
| 2016/0244262 A1 | 8/2016 | O'Brien et al. | |
| 2016/0297611 A1 | 10/2016 | Williams et al. | |
| 2017/0050315 A1 | 2/2017 | Sileane | |
| 2017/0057092 A1* | 3/2017 | Ito | B25J 9/1679 |
| 2017/0088360 A1 | 3/2017 | Brazeau et al. | |
| 2017/0151673 A1* | 6/2017 | Kobayashi | B25J 9/1697 |
| 2017/0322561 A1* | 11/2017 | Stiernagle | G07F 11/62 |
| 2018/0057263 A1 | 3/2018 | Beer | |
| 2018/0065818 A1 | 3/2018 | Gondoh et al. | |
| 2018/0065819 A1 | 3/2018 | Gondoh et al. | |
| 2018/0079082 A1* | 3/2018 | Takahashi | B25J 9/1697 |
| 2018/0257225 A1* | 9/2018 | Satou | B25J 9/1697 |
| 2019/0102965 A1 | 4/2019 | Greyshock et al. | |
| 2019/0185267 A1* | 6/2019 | Mattern | B65B 5/105 |
| 2019/0270128 A1* | 9/2019 | Stein | B21D 5/0281 |
| 2019/0270197 A1 | 9/2019 | Wagner et al. | |
| 2020/0078935 A1 | 3/2020 | Kimura et al. | |
| 2020/0385209 A1* | 12/2020 | Garcia | B65G 1/1373 |

FOREIGN PATENT DOCUMENTS

| | | | |
|---|---|---|---|
| CN | 202640363 U | 1/2013 | |
| CN | 205552559 U | 9/2016 | |
| CN | 206066477 U | 4/2017 | |
| DE | 44 07 324 A1 | 9/1994 | |
| DE | 196 20 569 A1 | 11/1997 | |
| DE | 10 2005 004 749 A1 | 8/2006 | |
| DE | 10 2007 005 534 A1 | 8/2008 | |
| DE | 10 2014 008 108 A1 | 12/2015 | |
| DE | 10 2015 007 863 A1 | 12/2015 | |
| DE | 10 2015 011 527 A1 | 3/2016 | |
| DE | 20 2017 101 230 U1 | 6/2017 | |
| DE | 10 2016 008 078 A1 | 1/2018 | |
| EP | 0 616 874 A1 | 9/1994 | |
| EP | 1422169 A2 | 5/2004 | |
| EP | 1 986 165 A1 | 10/2008 | |
| EP | 2 315 714 B1 | 10/2012 | |
| EP | 2 650 237 A1 | 10/2013 | |
| EP | 2 783 799 A2 | 10/2014 | |
| EP | 2 923 971 A1 | 9/2015 | |
| EP | 3 112 295 A1 | 1/2017 | |
| EP | 2 984 007 B1 | 3/2017 | |
| EP | 3 248 915 A1 | 11/2017 | |
| EP | 3 263 292 A1 | 1/2018 | |
| JP | S52-59475 A | 5/1977 | |
| JP | H06-39387 U | 5/1994 | |
| JP | 2003-181786 A | 7/2003 | |
| JP | 5617512 B2 * | 11/2014 | B25J 15/0004 |
| JP | 2017064817 A | 4/2017 | |
| JP | 2018-015815 A | 2/2018 | |
| WO | 2006/065147 A1 | 6/2006 | |
| WO | 2009/094995 A1 | 8/2009 | |
| WO | 2012/163666 A1 | 12/2012 | |
| WO | 2013/090970 A2 | 6/2013 | |
| WO | 2015/118171 A1 | 8/2015 | |
| WO | 2016/010968 A1 | 1/2016 | |
| WO | 2016/100235 A1 | 6/2016 | |
| WO | 2016/138101 A1 | 9/2016 | |
| WO | 2017/143367 A1 | 8/2017 | |
| WO | WO-2017198281 A1 * | 11/2017 | B07C 3/008 |
| WO | 2018/006112 A1 | 1/2018 | |
| WO | 2018132855 A1 | 7/2018 | |

OTHER PUBLICATIONS

International Search Report in PCT/AT2019/060075, mailed Jul. 17, 2019.
International Search Report in PCT/AT2019/060076, mailed Jul. 15, 2020.
International Search Report in PCT/AT2019/060077, mailed Sep. 11, 2019.
International Search Report in PCT/AT2019/060078, mailed Jul. 24, 2019.

* cited by examiner

ROBOT SYSTEM FOR TESTING A LOADING SPACE OF A LOADING AID IN A STORAGE AND ORDER-PICKING SYSTEM AND OPERATING METHOD THEREFOR

CROSS REFERENCE TO RELATED APPLICATIONS

This application is the National Stage of PCT/AT2019/060078 filed on Mar. 7, 2019, which claims priority under 35 U.S.C. § 119 of Austrian Application No. A50208/2018 filed on Mar. 9, 2018, the disclosure of which is incorporated by reference. The international application under PCT article 21(2) was not published in English.

BACKGROUND OF THE INVENTION

1. Field of the Invention

The invention relates to a method for controlling a robot in a storage and order-picking system, the robot comprising a gripping unit movable in relation to the robot base, wherein the goods are gripped from or out of a first goods carrier and are placed in or on a second goods carrier by the gripping unit, and wherein at least one of the goods carriers is designed as a loading aid. Moreover, the invention relates to a robot system with a robot having a gripping unit for gripping goods that is movable in relation to a robot base, wherein the robot is designed for gripping goods from or out of a first goods carrier and to place the goods in or on a second goods carrier by the gripping unit, and wherein at least one of the goods carriers is designed as a loading aid. Finally, the invention also relates to a storage and order-picking system for picking goods, comprising a storage area for storing goods and a working area for picking/repacking goods using a robot system of the aforementioned type.

2. Description of the Related Art

A method, a robot system and a storage and order-picking system of the mentioned type are, in general, known. For example, U.S. Pat. No. 9,868,207 B2 discloses a robot for gripping goods in a storage system in this regard. In the course of this, information on gripping the mentioned goods can be determined and, in connection with a database, be used for determining a gripping strategy.

The disadvantage of the known methods is that a good protruding beyond the loading space of a loading aid is not recognized and therefore can, as a consequence, cause faults during conveying and manipulating in the storage and order-picking system. Therefore, loading aids are commonly not entirely used, meaning they are often not loaded all the way up to a container edge and especially not beyond the container edge. This has an accordingly disadvantageous impact on the performance of the storage and order-picking system. Therefore, they are usually built to be larger than would actually be necessary.

SUMMARY OF THE INVENTION

It is thus the object of the invention to provide an improved method for controlling a robot in a storage and order-picking system, an improved robot system as well as an improved storage and order-picking system for picking goods. In particular, the disadvantages mentioned above are to be overcome, meaning faults during conveying and manipulation of goods in a storage and order-picking system are to be avoided, and the performance of the storage and order-picking system is to be increased as compared to the prior art.

This object is achieved by means of a method of the type mentioned at the beginning, in which
 in the region of a loading aid, a loading space is defined, which is intended for accommodating the goods,
 the loading space and the goods located within the region of the loading space are detected by a sensor system,
 after gripping of a good from or out of the goods carrier by the gripping unit, a check is performed whether a good protrudes beyond the loading space and
a) the good protruding beyond the loading space is gripped by the gripping unit and placed at a different position, or
b) the part of the good protruding beyond the loading space is moved into the loading space by the gripping unit,
 if the outcome of the check is positive.

In this regard, the check is performed, in particular, by a controller of a robot system which comprises the robot and the sensor system.

Moreover, the object of the invention is achieved by a robot system of the above-mentioned type, which robot system has a controller which is adapted for checking, after the gripping of a good from or out of the first goods carrier by the gripping unit, if a good protrudes beyond the loading space and for commanding the robot, upon a positive outcome of the check, to
 a) grip the good protruding beyond the loading space and place it at a different position, or
 b) move the part of the good protruding beyond the loading space into the loading space.

Finally, the object of the invention is also achieved by an (essentially automated) storage and order-picking system of the initially mentioned type, which comprises a (fully automated) robot system of the aforementioned type, which is in particular connected to the storage area in terms of conveyance.

By the suggested measures, a good protruding beyond the loading space of a loading aid is recognized, whereby faults during conveying and manipulating in a storage and order-picking system can be avoided. Thus, loading aids can be used in their entirety and, in particular, be loaded completely up to a container edge or, in a defined manner, even beyond the edge. Thus, the performance of the storage and order-picking system can be significantly increased as compared to the prior art. Therefore, they also require less installation space than has been the case to date.

It is principally advantageous if, for placing a good in or on the second goods carrier, a position within the loading space is calculated, at which the good likely does not protrude beyond the loading space. In the event that the placing of the good does not succeed as expected, the problem is recognized as stated above and consequently solved automatically. In doing so, the good is either gripped anew and lifted (case a), or the part of the good protruding beyond the loading space is simply pushed back, folded back or pulled back into the loading space, without completely lifting the good (case b). In pulling back the part of the good protruding beyond the loading space, the gripping function of the gripping unit is used. The pushing back or folding back of the part of the good protruding beyond the loading space, on the other hand, can take place with or without using the gripping function of the gripping unit. A gripping of the good is therefore not absolutely necessary in case b). Thus, case b) generally describes moving a part of the good protruding beyond the loading space back into the loading space without completely lifting the good in doing so.

The loading aid can, for example, comprise a bottom, side walls rising up from the bottom, a loading opening bounded by the side walls, and a loading space upwardly bounded by the loading opening. This means that the loading aid is loaded maximally up to the container edge in this case.

However, it is also advantageous if the loading aid comprises a bottom, side walls rising from the bottom, a loading opening bounded by the side walls, and the loading space upwardly protrudes beyond the loading opening. This means that the loading aid can be loaded beyond the container edge. Further, this means that the loading space is larger than the volume which is enclosed by the side walls and the loading opening of the loading aid. This way, the capacity of a loading aid is increased as compared to the prior art.

Moreover, it is advantageous if the loading space protrudes laterally beyond the side walls of the loading aid. This means that the loading space extends to not only upwardly protrude beyond the container edge but also to laterally protrude beyond it. Thereby, the storage capacity of a loading aid is further increased as compared to the prior art.

Furthermore, it is advantageous if the loading space extends downwards below the plane of the loading opening in the section that protrudes beyond the side walls. This means that goods can also hang down over the side of container edge. Thereby, the storage capacity of a loading aid is increased even further as compared to the prior art.

In the context of the invention, a "good" in particular is understood as an object that can be handled individually and/or a group of objects that can be handled individually.

A "goods carrier" can, for example, be a loading aid (such as a box, a tray or a container or a pallet) or can be formed by a conveyor (such as a belt conveyor, a roller conveyor or a chain conveyor). However, a "goods carrier" can also be formed by a transport platform (for example on a storage and retrieval unit or an autonomous transport vehicle). In this context, the first goods carrier serves as the "source", the second goods carrier serves as the "target". The second goods carrier can, for example, also be formed by a pivotable flap. In this case, the robot grips a good from or out of the source and places it on the flap. After this, the good can be discharged into a further container, for example, by actuating, i.e. elevating, the flap.

A "loading aid", as indicated above, can be formed by a container, for example by a case, by a box or by a cardboard box. In this regard, it is noted that a tray usually also has side walls and can thus also be understood as a flat container. In the case of a pallet, the loading space can extend, for example, upwardly in a cuboidal manner.

In a "storage and order-picking system", goods can, for example, be delivered to a goods receiving and then optionally be repacked and stored in a storage area. The goods can also be picked according to an order, meaning that they can be retrieved from the storage area, collected to an order and provided for transport at a goods issue. In contrast to a manufacturing process, the goods are not substantially changed between the goods receiving and the goods issue. However, a slight change in shape is possible, in particular in case of non-rigid bodies such as pouches or sacks or other resilient packaging, for example from cardboard or plastic materials.

If an error occurs, meaning a negative outcome of the check if a good protrudes beyond the loading space, the following scenarios, in particular, are conceivable:

i) The good is gripped properly from the first goods carrier (source) formed as a loading aid and also properly placed in or on the second goods carrier (target) by the gripping unit. When moving the gripping unit out of the loading aid, however, a good different from the one gripped by the gripping unit is taken along or pulled along, which good consequently drops back into the loading aid in such an unfortunate manner that it protrudes beyond its loading space.

ii) The good is gripped from the first goods carrier (source) formed as a loading aid by the gripping unit, but inadvertently drops back from the gripping unit into the loading aid in such an unfortunate manner that it protrudes beyond its loading space.

iii) The good is gripped properly from or out of the first goods carrier (source) by the gripping unit and is placed in the second goods carrier (target) formed as a loading aid. There, however, it protrudes beyond the loading space.

iv) The good is gripped properly from or out of the first goods carrier (source) by the gripping unit, but inadvertently drops from the gripping unit into the second goods carrier (target) formed as a loading aid in such an unfortunate manner that it protrudes beyond its loading space.

v) The good is gripped properly from or out of the first goods carrier (source) by the gripping unit. However, it inadvertently drops from the gripping unit but lands neither on the first goods carrier nor on the second goods carrier (target).

Generally speaking, the errors described in cases i) through v) can be rectified either by the good being gripped anew (case a) or by pushing, folding or pulling the part of the good protruding beyond the loading space back into the loading space (case b).

Additionally, in case i), two different scenarios for rectifying the error are conceivable: In a first variant, the good protruding beyond the loading space of the first goods carrier (source) is, in any event, completely returned into the loading space of the first goods carrier (source). In a second variant, it is checked whether the good protruding beyond the loading space of the first goods carrier (source) contributes to the completion of a transfer order, which comprises the transfer of multiple goods from the first goods carrier into the second goods carrier. If this is the case, the good protruding beyond the loading space of the first goods carrier (source) is conveyed into the loading space of the second goods carrier (target). If this is not the case, the good protruding beyond the loading space of the first goods carrier (source) is, in any event, completely returned into the loading space of the first goods carrier (source).

In case v), it is furthermore advantageous if there is an additional check on whether a good dropped from the gripping unit is located completely outside of the loading space.

It is particularly advantageous if there is a check on whether the good dropped from the gripping unit has fallen on the floor. In both cases, it is conceivable that the error that occurred cannot be rectified by the robot system itself and hence, an alarm message is issued. Subsequently, the problem can also be solved by an operator, where applicable.

In the above context, however, it is also advantageous if
a check is conducted on whether the good that was dropped from the gripping unit is located on a rest surface which is arranged to be adjacent to the first goods carrier and/or to the second goods carrier, and
the good located on the rest surface is gripped by the gripping unit and is placed
i) in or on the first goods carrier, or
ii) in or on the second goods carrier, or
iii) at a clearing place.

This way, the problem that occurred can be solved by the robot system itself, whereby an intervention by an operator is unnecessary. The rest surface can be formed by a horizontally or inclined oriented plane and by a pivotable flap and can be arranged between the goods carriers but also around the goods carriers. The flap can be, in particular, motor-driven or be actuated by the robot. Using a rest surface, which is designed in the form of an inclined oriented plane, a good dropped from the gripping unit can be automatically conveyed into or onto the first goods carrier, into or onto the second goods carrier or to a clearing place. Using a flap, a good dropped from the gripping unit can be conveyed either into or onto the first goods carrier, into or onto the second goods carrier or to a clearing place.

As stated above, it can be provided that in certain cases, an alarm message is generated. Therefore, it is generally advantageous if the check on whether a good protrudes beyond the loading space as well as the step a) or step b) are repeated recursively and the recursive repetition of this procedure is canceled after a predefined number of repetitions and an alarm message is generated. Accordingly, an alarm message is generated for problems which cannot be solved by the robot system alone in order to alert the operating staff to the problem which has occurred.

However, it is also advantageous if the check on whether a good protrudes beyond the loading space as well as the step a) or step b) are repeated recursively until the outcome of the check is negative. In this variant of the proposed method, it is assumed that all problem potentially occurring during the transfer of the goods can be solved by the robot system alone. This can be ensured particularly if the working area for the robot is designed such that goods dropped from the gripping unit are also always located within the operating range of the robot. This can be achieved, for example, by having the gripping unit be able to also reach the floor and thereby goods falling on the floor, or also by having corresponding rest surfaces provided around the first goods carrier and the second goods carrier.

It is particularly advantageous if
 the gripping of a good from or out of the first goods carrier and a detection of the second goods carrier and the goods located in or on the second goods carrier by the sensor system, and
 the placing of a good in or on the second goods carrier and a detection of the first goods carrier or the goods located in or on the first goods carrier by the sensor system takes place in alternation, wherein the operations overlap particularly in terms of time. In other words, this means that the gripping of a good and the check on whether a good protrudes beyond a loading space takes place alternately in two different places, namely on the first goods carrier and on the second goods carrier. This avoids, particularly in the optical detection of the first and second goods carrier, that the gripping unit covers the goods carrier to be checked and thus, thwarts a check. Moreover, the method is accelerated overall by the parallelization of the running processes.

It is also advantageous if the check on whether a good protrudes beyond the loading space takes place after gripping a different good from or out of the first goods carrier. This variant relates to two cases in particular, namely if a different good than the one that has been gripped is dropped back into or onto the first goods carrier formed as a loading aid, or if the gripping unit has placed a good in or on the second goods carrier formed as a loading aid but prevents an optical detection of the second goods carrier and the goods stored therein. In the first case, a good different from the one gripped is inadvertently pulled along and can consequently protrude beyond the loading space of the first goods carrier. In the second case, a detection (particularly, an optical detection) of the second goods carrier and the goods stored therein can take place only once the gripping unit is moved out of the region of the second goods carrier.

The check on whether a good protrudes beyond a loading space can generally take place during the movement of the gripping unit from the first goods carrier to the second goods carrier and vice versa, so that no noticeable waiting periods are caused by the check. The loading aids can therefore be transported away even immediately after the repacking or order-picking operation by a conveying device.

It is favorable if the first goods carrier is formed as a first loading aid and the second goods carrier as a second loading aid, and
 in the region of the first loading aid, a loading space is defined, which is intended for accommodating goods, and in the region of the second loading aid, a further loading space is defined, which is intended for accommodating goods,
 the loading spaces and the goods located in the region of the loading spaces of the first loading aid and of the second loading aid are each detected by the sensor system, both after the gripping of a good from or out of the first loading aid by the gripping unit and after the placing of the good in or on the second loading aid by the gripping unit, a check takes place on whether a good protrudes beyond one of the loading spaces, and
a) the good protruding beyond the loading space is gripped by the gripping unit and placed at a different position, or
b) the part of the good protruding beyond the loading space is moved into the loading space by the gripping unit
if the outcome of the check is positive.

In this embodiment variant, both goods carriers are formed as loading aids. The first loading aid therefore has a first loading space and the second loading aid has a second loading space.

It is favorable if the check on whether a good protrudes beyond the loading space takes place after the gripping unit and/or the good gripped by the gripping unit has been completely moved out of the loading space. If the check takes place after the good has been gripped, the gripping unit and the good held therewith should therefore have been completely moved out of the loading space before the check. If the check takes place after the good has been placed, only the gripping unit (which now does not hold any more goods) has to have been moved out of the loading space before the check. These measures ensure that a static condition ensues in the loading space, which condition is not disturbed by the transfer operation of the goods. Accordingly, this also ensures that the check on whether a good protrudes beyond the loading space is valid.

Moreover, it is advantageous if the check on whether a good protrudes beyond the loading space takes place after the gripping unit and/or the good gripped by the gripping unit has been completely moved out of a detection region of the sensor system, in particular out of a detection region which relates to the loading space of a goods carrier and the goods contained therein. It would be conceivable that the gripping unit and/or the good gripped by the gripping unit from the loading space covers parts of the goods carrier and the (other) goods contained therein after being moved completely out of the loading space, so that a check on whether a good protrudes beyond the loading space is possible only for a part of the region captured by the sensor system. However, a complete check is possible by means of the suggested measures.

Additionally, it is particularly advantageous if the check on whether a good protrudes beyond the loading space takes place after the gripping unit and the good gripped by the gripping unit are laterally moved away completely from a goods carrier. As long as the gripping unit and the good gripped by the gripping unit are located vertically above a goods carrier, it cannot be ruled out that the good may inadvertently fall back into or onto the goods carrier. However, a valid check is possible by means of the suggested measures.

It is favorable if the check on whether a good protrudes beyond the loading space is performed after each gripping of a good. This allows to detect a good protruding beyond the loading space within a narrow time frame of the occurrence of the error, and the accumulation of the impacts of multiple errors occurring consecutively is avoided. The aforementioned measures relate particularly to the first goods carrier (source).

Similarly, it is favorable if the check on whether a good protrudes beyond the loading space is performed after each placing of a good in or on the second goods carrier. This also allows to detect a good protruding beyond the loading space within a narrow time frame of the occurrence of the error, and the accumulation of the impacts of multiple errors occurring consecutively is again avoided. These measures relate particularly to the second goods carrier (target).

However, it is also advantageous of the check on whether a good protrudes beyond the loading space is performed after the placing of a plurality of goods (in particular, after the placing of all goods associated with an order) in or on the second goods carrier. This allows to reduce the number of checks and thereby the computing effort and the computation time for them. This variant is therefore particularly suitable for robot systems with a limited computational power.

It should be noted at this point that a check can take place after the gripping of the good (but before placing the same) and a further check can take place after placing the good. However, it is also conceivable that only one check takes place after placing the good and therefore, chronologically after the gripping of the good. This means that the time for the check provided after the gripping is then chronologically pushed back, specifically, to a time after the good has been placed.

It is advantageous if an occupied status of the gripping unit after the gripping of a good is monitored and the check on whether a good protrudes beyond the loading space is performed upon recognition of an unoccupied but activated gripping unit. By this, the unwanted dropping of a good from the gripping unit is recognized and, consequently, the check on whether a good protrudes beyond the loading space is initiated. The unwanted dropping is characterized precisely in that the gripping unit is unoccupied but activated. In the event that the gripping unit is occupied and activated, a good is held by the gripping unit. In the event that the gripping unit is unoccupied and deactivated, a good was placed or dropped deliberately and/or intentionally. The monitoring of the occupied status of the gripping unit can, for example, be carried out by a sensor system on the gripping unit, which sensor technology is specifically designed for this. The monitoring of the occupied status of the gripping unit can, however, also be carried out by the sensor system which is provided for detecting the loading space and the goods located within the region of the loading space. For this purpose, the sensor system can, for example, have a scale which is positioned below a goods carrier and which can measure the weight of the goods carrier along with the goods located therein. If the good is removed, the weight measured by the scale decreases. If the good falls from the gripping unit back onto the goods carrier from or out of which the good was removed, the weight measured by the scale increases. Accordingly, it can be concluded that the good was dropped (inadvertently) from the gripping unit. Equivalently, it can be determined if a good was inadvertently dropped onto or into the second goods carrier (target). Further information on the use with a scale in the stated context can be found in the international patent application PCT/AT2018/060012.

Moreover, it is favorable if, according to an order, the goods
  are transported to the robot by the first goods carrier,
  are transferred from or out of the first goods carrier into or onto the second goods carrier by the robot, and
  are transported away from the robot by the second goods carrier.

In this variant, the goods are transported to the robot, for example, directly on a belt conveyor, a roller conveyor or a chain conveyor, and/or with a loading aid on a belt conveyor, a roller conveyor or a chain conveyor. Thus, the robot can statically remain in one place. However, in general, it would also be conceivable that the robot is designed as a mobile robot. For example, the robot can be installed on an autonomous transport vehicle (automated guided vehicle, in short "AGV").

It is favorable for the sensor system to comprise a camera and/or a room depth sensor and/or a laser scanner and/or an ultrasonic sensor. Using these sensors, it can be determined whether a good protrudes beyond the loading space of the loading aid. Furthermore, by the sensor system, the location and position of a good in or on a goods carrier can be determined and used as a reference for gripping by the gripping unit. By means of a camera (stereo camera), a room depth sensor, a laser scanner or an ultrasonic sensor, a three-dimensional image of the good lying in or on the goods carrier can be captured. However, a three-dimensional image can also be generated from multiple two-dimensional images captured from different angles. These two-dimensional images can, for example, come from stereomerically arranged cameras or can also be captured during a relative movement between the goods and the camera. In this regard, the (single) camera can move in relation to the non-moving good or vice versa. By the three-dimensional detection of the goods lying in or on the goods carrier, a surface structure of the goods can be detected as well and the suitability for gripping by the gripping unit can be determined. For example, highly convex surfaces are less suitable for gripping by a suction gripper, whereas plane surfaces are particularly well-suited for gripping by a suction gripper. A camera is in particular also suited for capturing a surface character of the goods to be gripped, for example an imprint on packaging.

It is advantageous for the gripping unit to comprise at least one suction gripper. Suction grippers are suited for quickly gripping goods with different properties, for example both for manipulating more or less rigid bodies (for example, boxes, cartons and plastic boxes) and for manipulating resilient and in particular flexurally limp bodies (for example, sacks or bags filled with objects).

At this point, it should be noted that the suggested method and/or the suggested robot are generally (i.e. not only in combination with suction grippers) suitable both for gripping rigid goods, as well as for deformable goods, such as sacks or bags. Both rigid goods and deformable goods can be formed by an object that can be handled individually and/or be formed by a group of objects that can be handled individually. In concrete terms, a good may therefore take the form of a cardboard or plastic box, which is for example filled with multiple objects. Likewise, a good may also take the form of a sack or a bag which is filled with multiple objects. The method and/or the robot system according to the invention is particularly well-suited for goods in the form of foil bags, in particular in the form of so-called "polybags" and/or "plastic bags" made from polyethylene or polypropanol. Such foil bags are predominantly used in the textile industry and are, for example, used for packaging T-shirts, shirts and the like. Often, such foil bags are also used in the shoe industry or in the food industry.

Moreover, it is advantageous for the robot to be designed as a jointed-arm robot or a gantry robot. These designs are proven and tested means for manipulating goods and are available on the market in a wide variety of types.

Finally, it is advantageous if the working area of the storage and order-picking system is designed for fully automated order-picking of goods, and a first conveying device for transporting goods in or on first goods carriers (storage loading aids, in particular containers) is arranged between the storage area and the robot in the working area, and/or a second conveying device for transporting goods in or on second goods carriers (order loading aids, in particular cardboard boxes) is provided between the storage area and the robot in the working area, wherein the robot is designed for gripping at least one good from or out of the first goods carrier (storage loading aid, in particular container) for an order and to place the at least one good in or on the second goods carrier (order loading aid, in particular cardboard boxes) for this order. Hence, an order-picking operation can be carried out particularly efficiently and fast. At this point, it should be noted that the embodiment variants disclosed for the method and the advantages resulting therefrom can likewise refer to the disclosed device and vice versa.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side etc., chosen in the description refer to the directly described and depicted figure and, in case of a change of position, are to be analogously transferred to the new position.

Figure 1:
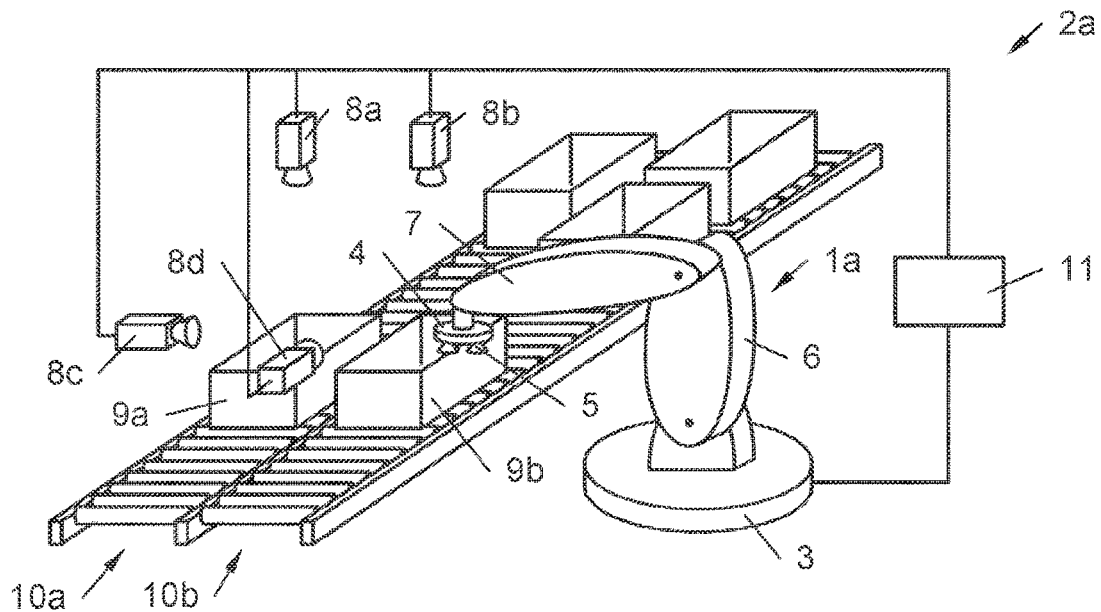
FIG. 1 a first, simplified example of a robot system having a robot and a stationarily installed camera system in an oblique view.

FIG. 1 shows a robot 1*a* in a robot system 2*a*. The robot 1*a* comprises a gripping unit 4 which is movable in relation to a robot base 3 and which comprises three suction grippers 5 spaced apart from one another in this example. The gripping unit 4 is connected to the robot base 3 in an articulated manner via a robot arm comprising two arm segments 6 and 7. Moreover, FIG. 1 shows a sensor system 8*a* . . . 8*d*, which serves for the detection of the goods carriers 9*a* and 9*b* as well as the goods lying therein and, in the present example, comprises two cameras 8*a*, 8*b* and two further optional cameras 8*c*, 8*d*. However, the goods are not visible in FIG. 1 since they are stored in the goods carriers 9*a* and 9*b*, which are designed as containers in this example. The container 9*a* is a source container from which goods are gripped/removed by the gripping unit 4, and the container 9*b* is a target container, into which goods are placed/thrown by the gripping unit 4.

The cameras 8*a*, 8*b* are arranged above the containers 9*a* and 9*b* and are each designed as a stereo camera in this example. Accordingly, the cameras 8*a*, 8*b* detect a three-dimensional image of the inside of at least the containers 9*a* and 9*b* and the goods stored therein. In general, it would also be possible that merely the camera 8*a* (stereo camera) is provided above the container 9*a* or merely the camera 8*b* (stereo camera) is provided above the container 9*b*. Furthermore, it is conceivable that merely one common camera 8*a* (stereo camera) is provided for the containers 9*a* and 9*b*. Although stereo cameras are used in a preferred embodiment, the cameras 8*a*, 8*b* could also be designed as a camera for detecting a two-dimensional image of the inside of at least the containers 9a and 9b and the goods stored therein.

The containers 9a and 9b as well as the goods protruding beyond them can also be detected from the side by means of the two optional cameras 8c, 8d. The specific purpose of the optional cameras 8c, 8d is elucidated in detail with the aid of FIGS. 6 and 7. The position and orientation of the two optional cameras 8c, 8d depicted in FIG. 1 is to be understood purely for illustrative purposes and other positions and orientations for the two optional cameras 8c, 8d are conceivable.

The arrangement shown in FIG. 1 further comprises a conveying device for transporting the containers 9a, 9b to the robot system 2a and for transporting the containers 9a, 9b away from the robot system 2a. In particular, the conveying device comprises a first conveying path 10a for transporting the containers 9a, 9b to the robot system 2a and a second conveying path 10b for transporting the containers 9a, 9b away from the robot system 2a.

Finally, the arrangement depicted in FIG. 1 comprises a controller 11 which is connected with the cameras 8a . . . 8d and the robot 1a and particularly serves for checking whether a good protrudes beyond a loading space of the containers 9a and 9b. Furthermore, the controller 11 serves for controlling the movement of the gripping unit 4 according to a predefined transfer operation.

Figure 2:
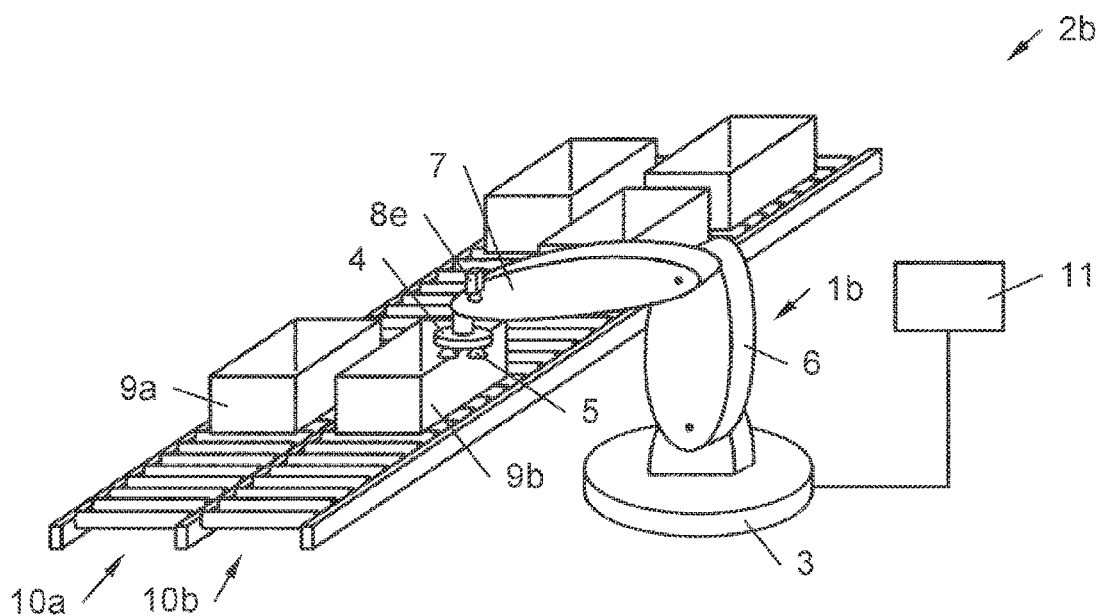
FIG. 2 similar to FIG. 1, but with a movable camera system having a camera mounted on a robot arm segment of the robot.

FIG. 2 shows a robot system 2b which is very similar to the robot system 2a shown in FIG. 1. In contrast, however, no cameras 8a . . . 8d are arranged above and on the side of the containers 9a and 9b, but a single camera 8e is arranged directly on the second arm segment 7 of the robot 1b. This camera 8e is also connected to a controller 11 (connection not shown). Furthermore, the camera 8e can, in turn, be designed as a stereo camera to detect a three-dimensional image of the containers 9a and 9b as well as the goods stored therein, for example, by the camera 8e being moved above the container 9a or above the container 9b by the robot 1a and an image being detected there. However, it would also be conceivable that the camera 8e is designed merely for detecting a two-dimensional image, and a three-dimensional image of the containers 9a and 9b as well as of the goods stored therein is generated by detecting multiple two-dimensional images during a movement of the camera 8e and subsequent calculation of the three-dimensional image. Furthermore, the camera 8e can also be positioned such that the containers 9a, 9b as well as the goods protruding beyond them can also be detected from the side. At this point, it should also be noted that the camera 8e can also be combined with the cameras 8a . . . 8d of the robot system 1a of FIG. 1.

Figure 3:
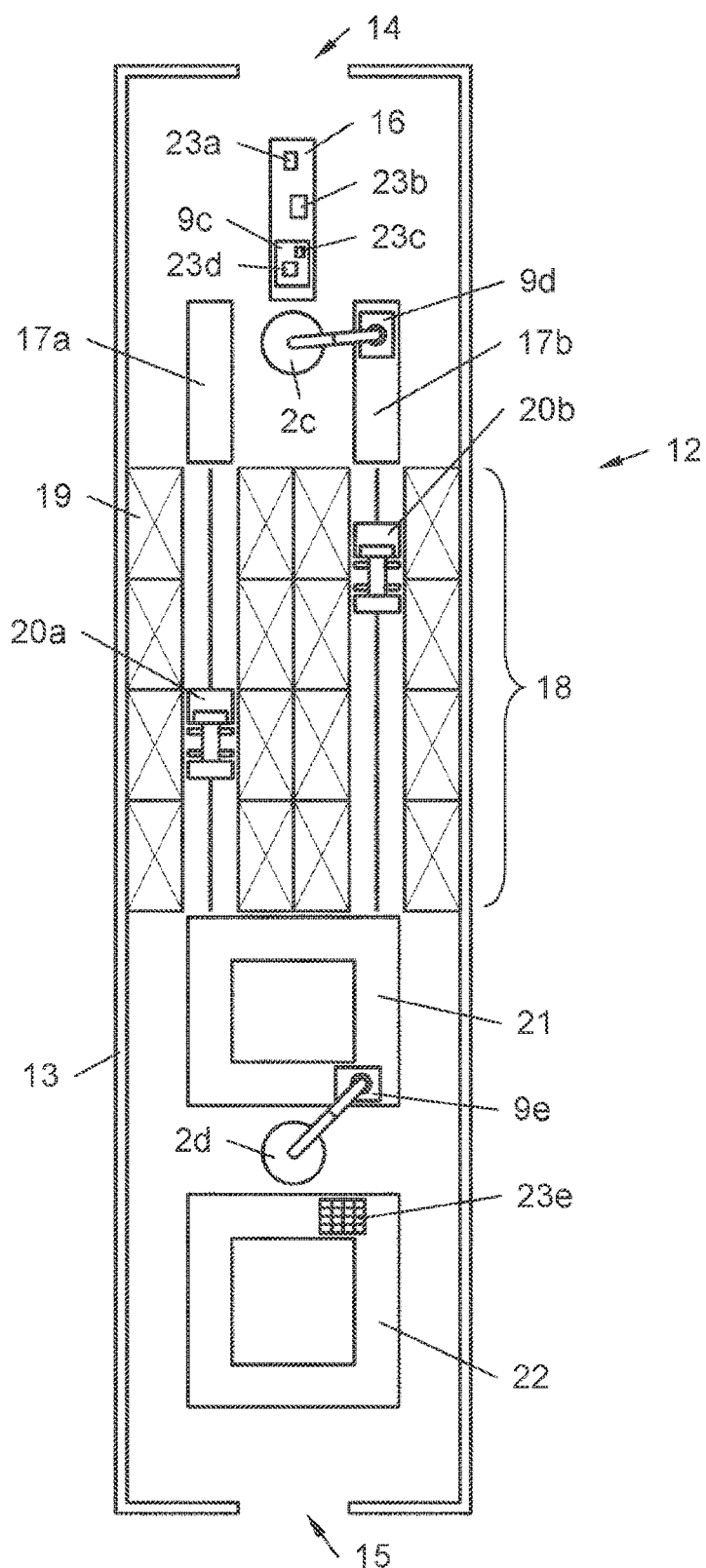
FIG. 3 a schematically shown example of a storage and order-picking system in a top view.

FIG. 3 shows a storage and order-picking system 12 comprising a building 13 as well as a gate at a goods receiving 14 and a gate at a goods issue 15. In the region of the goods receiving 14, there is a first conveying path 16 and two second conveying paths 17a and 17b. The first conveying path 16 connects the goods receiving 14 to a robot system 2c. The two second conveying paths 17a and 17b connect the robot system 2c to a storage area 18, which comprises multiple storage racks 19 as well as storage and retrieval units 20a and 20b, which move in rack aisles running between the storage racks 19. At that end of the rack aisles, which is opposite to the second conveying paths 17a and 17b, there is a third conveying path 21, which is designed annularly and leads to a further robot system 2d in the present example. A fourth conveying path 22, which connects the robot system 2d to the goods issue 15 in terms of conveyance, is arranged in the operating range of the robot system 2d as well.

Figure 4:
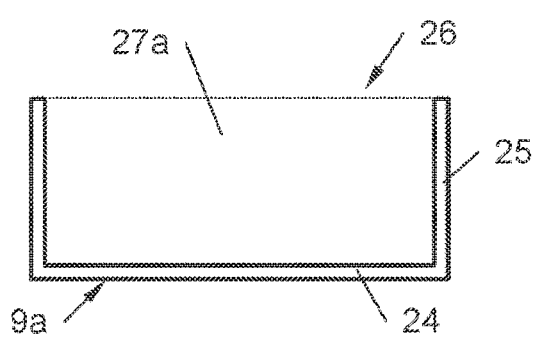
FIG. 4 a container having a loading space which is bounded towards the top by a loading opening of the container.

FIG. 4 now shows the container 9a in detail. The container 9a comprises a bottom 24, side walls 25 rising up from it and a loading opening 26 bounded by the side walls 25. Furthermore, the container 9a has a loading space 27a which is bounded towards the top by the loading opening 26.

Figure 5:
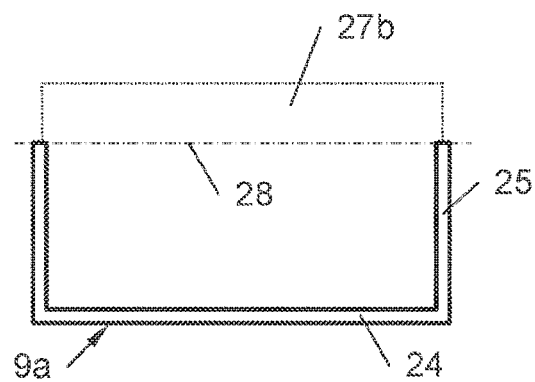
FIG. 5 a container having a loading space which protrudes upwardly beyond the loading opening.

FIG. 5 now shows the container 9a having a loading space 27b which protrudes upwardly beyond the loading opening 26, specifically beyond the plane 28 of the loading opening 26.

Figure 6:
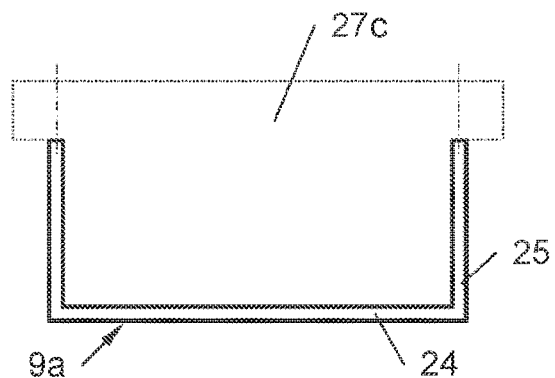
FIG. 6 a container having a loading space which laterally protrudes beyond the side walls of the container.

FIG. 6 shows the container 9a further having a loading space 27c which, on the one hand, protrudes upwardly beyond the loading opening 26, but on the other hand, also protrudes laterally beyond the side walls 25.

Figure 7:
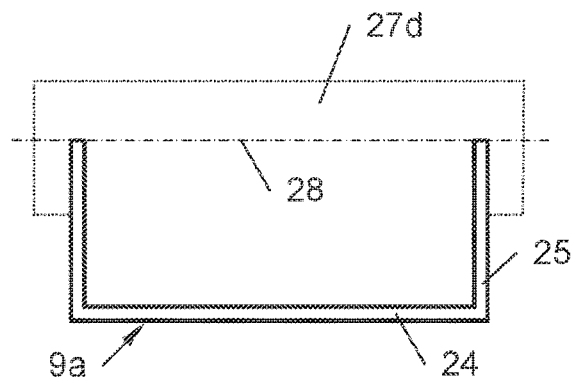
FIG. 7 a container having a loading space which, in the section protruding beyond the side walls, extends downwards below the plane of the loading opening.

FIG. 7 finally shows the container having a loading space 27d which not only protrudes upwardly beyond the loading opening 26 and laterally beyond the side walls 25, but also, in the section protruding beyond the side walls 25, extends downwards below the plane 28 of the loading opening 26.

The loading aid 9a shown in FIGS. 4 to 7 is designed as a container, concretely, for example, as a cardboard box, carton or box. However, it is also generally conceivable that the loading aid used in the presented method is designed as a pallet or tray. Since a tray usually has (low) side walls, it can also be understood as a container.

Figure 8:
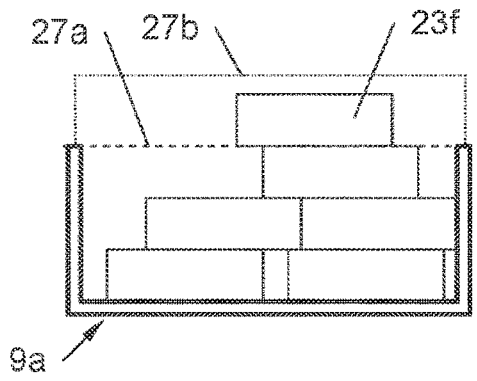
FIG. 8 a container having a loading space according to FIG. 5 and cuboidal goods stored therein.

FIG. 8 shows the container 9a loaded with cuboidal goods 23f, all of which are not located within the loading space 27a (represented in dashed lines), as the topmost good 23f protrudes beyond the plane 28 of the container opening 26. The loading depicted in FIG. 8 is therefore not permissible for the loading space 27a. However, all of the goods 23f are located within the loading space 27b (represented in dotted fashion) although the topmost good 23f protrudes beyond the plane 28 of the container opening 26. The loading depicted in FIG. 8 is therefore permissible for the loading space 27b. The representation makes clear that the loading space 27b has a larger volume than the volume enclosed by the bottom 24, the side walls 25 and the container opening 26, and that the container 9a is loaded more heavily than it is the case in automated storage and order-picking systems according to the prior art. According to the prior art, containers 9a are actually only loaded at maximum up to the plane 28 of the container opening 26. Consequently, the performance of a storage and order-picking system 12, in which containers 9a with relatively large loading spaces 27b, 27c and 27b in terms of volume are used, is increased with respect to conventional storage and order-picking systems.

Figure 9:
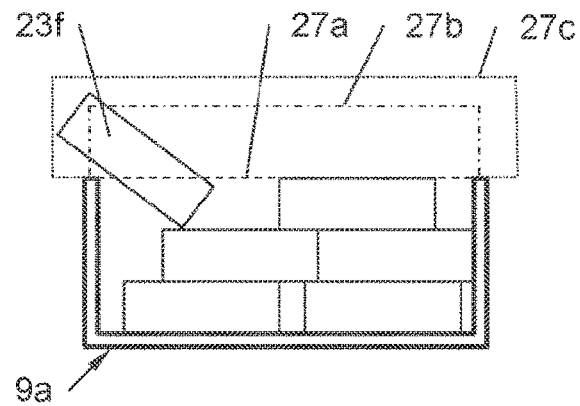
FIG. 9 a container having a loading space according to FIG. 6 and cuboidal goods stored therein.

FIG. 9 shows the container 9a loaded with cuboidal goods 23f, all of which are not located within the loading space 27a (represented in dashed lines), as the topmost good 23f protrudes beyond the plane 28 of the container opening 26. The loading depicted in FIG. 9 is therefore not permissible for the loading space 27a. The topmost good 23f furthermore protrudes beyond the loading space 27b (represented in a dotdashed fashion). The loading depicted in FIG. 9 is therefore also not permissible for the loading space 27b. However, FIG. 9 shows a loading space 27c (represented in dotted fashion) which protrudes laterally beyond the side walls 25. Although the topmost good 23f protrudes laterally beyond the container wall 25, it is still located within the loading space 27c and therefore causes no negative outcome of the check on whether all goods 23f are located within the loading space 27c.

Figure 10:
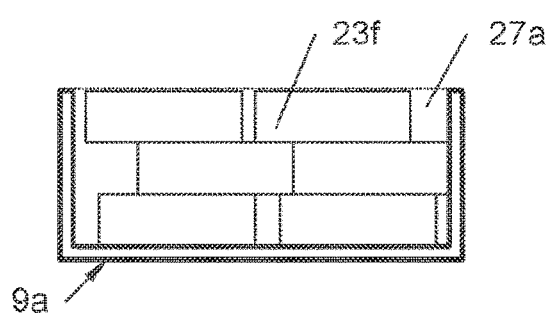
FIG. 10 a container having a loading space according to FIG. 4 and cuboidal goods stored therein.

FIG. 10 further shows the container 9a loaded with goods 23f, but with a loading space 27a extending only to the loading opening 26. Here, as well, all goods 23f are arranged within the loading space 27a and therefore cause no negative outcome of the check on whether all goods 23f are located within the loading space 27a.

Figure 11:
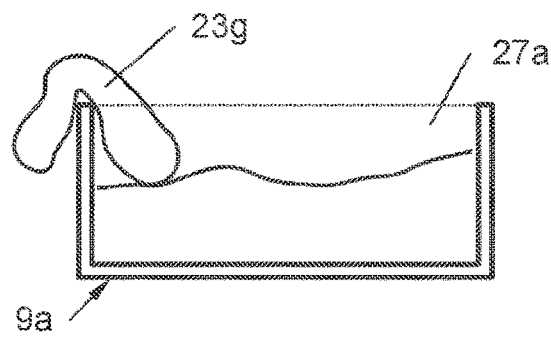
FIG. 11 a container having a loading space according to FIG. 4 with a flexurally limp good hanging over the container edge.

FIG. 11 shows the container 9a loaded with goods 23g, which, again, has a loading space 27a extending only to the loading opening 26. In this example, a flexurally limp good 23g hangs over the container edge, whereby the check on whether all goods 23g are located within the loading space 27a has a negative result. In the case of a loading space which, in the section protruding beyond the side walls 25, extends downwards below the plane 28 of the loading opening 26, as it is depicted in FIG. 7 for the loading space 27d, it would, however, be conceivable that the result of the aforementioned check is positive, provided that the loading space for the good 23g is formed to be large enough.

From FIG. 11, it can particularly also be seen that the suggested method and/or the suggested robot system 2a . . . 2d as well as the suggested storage and order-picking system 12 are not only suited for the manipulation of more or less rigid and cuboidal bodies (goods 23f), but also for the manipulation of flexurally limp and irregularly shaped goods 23g.

Figure 12:
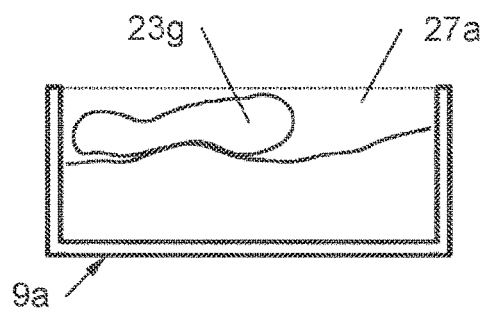
FIG. 12 a container having a loading space according to FIG. 4 and flexurally limp goods stored therein.

Finally, FIG. 12 shows a container 9a loaded with the irregularly shaped goods 23g in which container 9a all goods 23g are located within the loading space 27a extending to the loading opening 28. The check on whether all goods 23g are located within the loading space 27a therefore, again, has a positive result.

FIGS. 4 to 12 refer to the container 9a. Of course, the disclosed teaching can also be unrestrictedly applied to the containers 9b . . . 9e.

Figure 13:
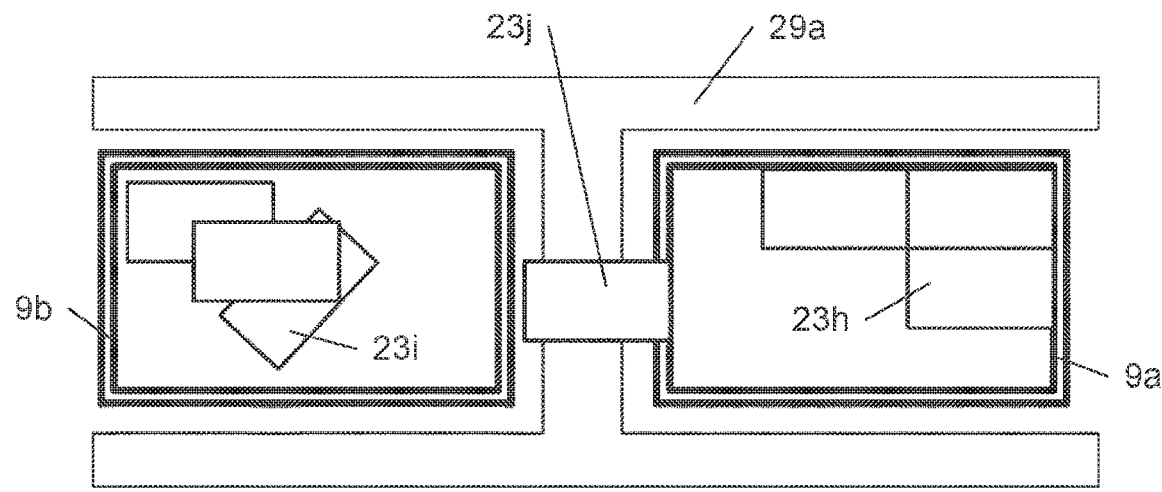
FIG. 13 an arrangement with two containers and a rest surface in the region of these containers, on which rest surface lies a good.
Figure 14:
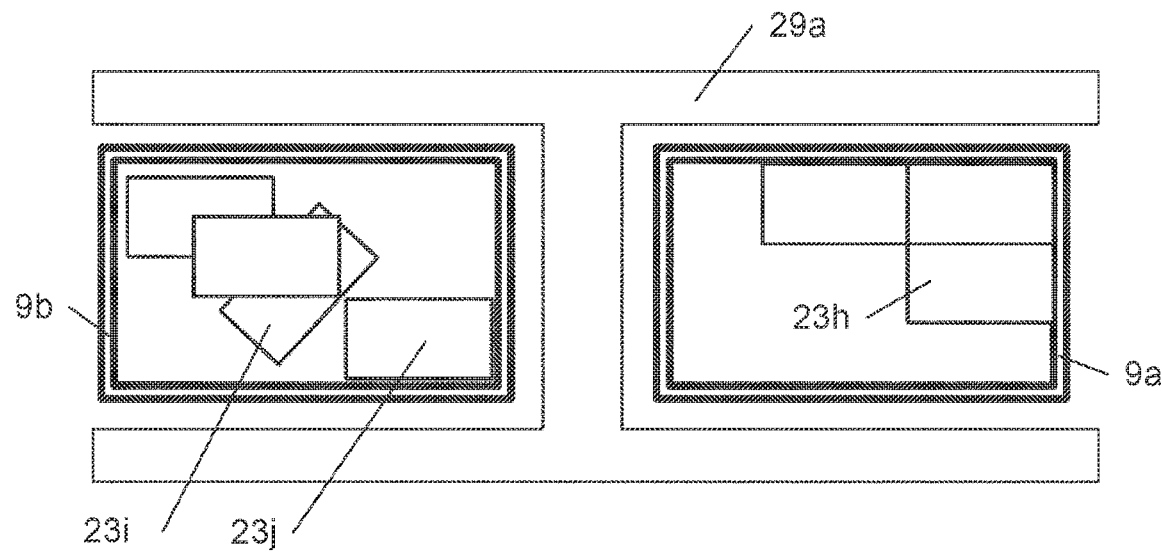
FIG. 14 the arrangement according to FIG. 13, however, in a condition in which the good has been removed from the rest surface.

FIG. 13 shows an arrangement with two containers 9a and 9b as well as a rest surface 29a which extends between the containers 9a, 9b and partially around the containers 9a, 9b. This way, a good 23j inadvertently dropped from the gripping unit 4 can be prevented from falling onto the floor. Instead, the good 23j falls onto the rest surface 29a as it is depicted in FIG. 13. The good 23j can be gripped from this rest surface 29a and be placed in either the first container 9a or in the second container 9b. FIG. 14 shows the arrangement from FIG. 13 in a condition in which the good 23j has been placed in the second container 9b.

Figure 15:
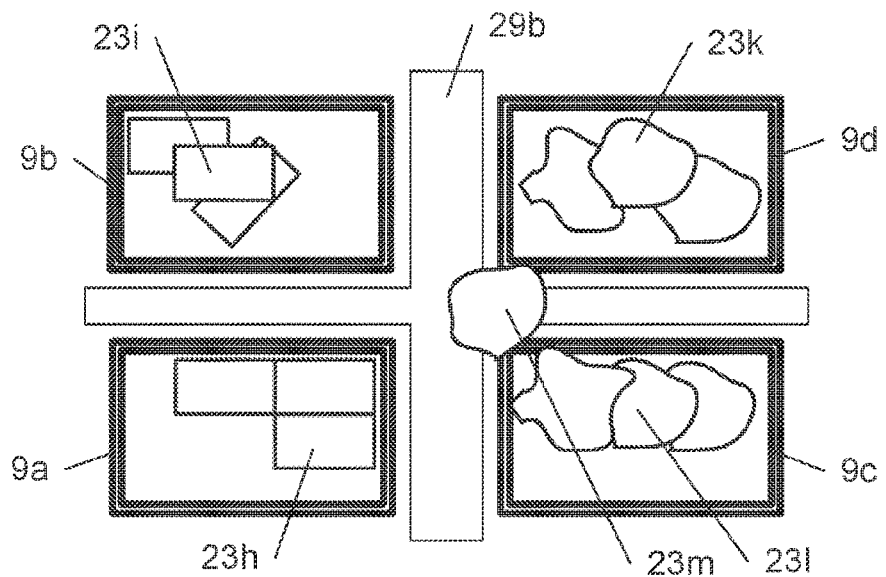
FIG. 15 an arrangement with four containers and a rest surface in the region of these containers, on which rest surface lies a good.
Figure 16:
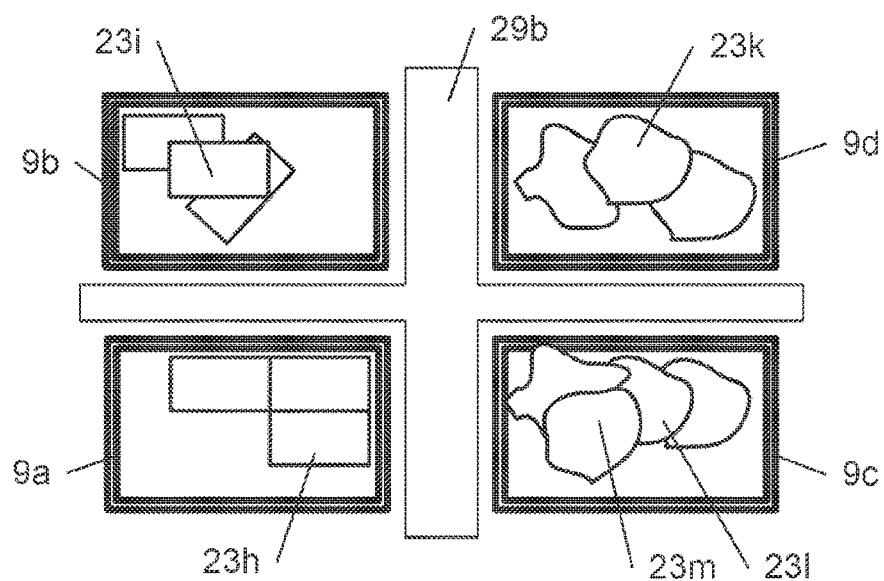
FIG. 16 the arrangement according to FIG. 15, however, in a condition in which the good has been removed from the rest surface.

FIG. 15 shows an arrangement with four containers 9a . . . 9d and a rest surface 29b, which arrangement is very similar to the arrangement shown in FIGS. 13 and 14. However, in contrast to these, not two containers 9a and 9b are present, but rather four containers 9a . . . 9d. The rest surface 29b extends in a cruciform manner between the containers 9a 9d. In this example, on the other hand, it is presumed that a good 23m was dropped inadvertently from the gripping unit 4 onto the rest surface 29b. The good 23m can be gripped from the rest surface 29b and be placed in one of the containers 9a . . . 9d. FIG. 16 shows the arrangement from FIG. 15 in a condition in which the good 23m has been placed in the container 9c.

The rest surfaces 29a, 29b shown in FIGS. 13 to 16 can be formed by horizontal surfaces (and possibly form a clearing place), however, they can also be inclined towards one of the containers 9a . . . 9d. This way, goods 23a . . . 23n dropped from the gripping unit 4 automatically slide to one of the predefined places. Inclined rest surfaces 29a, 29b primarily serve for automatically conveying goods 23a . . . 23n inadvertently dropped from the gripping unit 4 to one of the predefined places. However, it is also conceivable that the goods 23a . . . 23n are intentionally dropped onto an inclined rest surface 29a, 29b or placed thereon, in order to automatically convey the goods 23a . . . 23n to one of the predefined places. In doing so, it is advantageous that the distance traveled by the gripping unit 4 during the transfer of goods 23a . . . 23n can be reduced.

Figure 17:
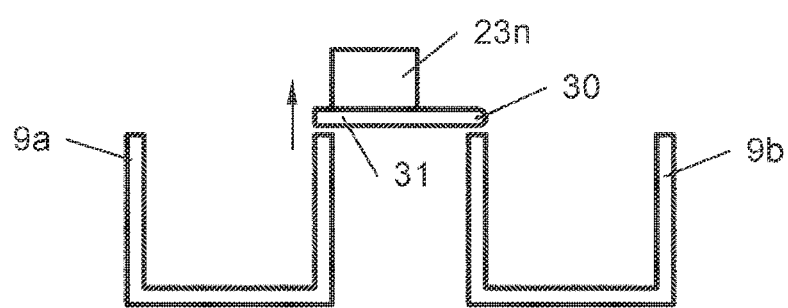
FIG. 17 an example for a pivotable flap arranged between a first and second container.

FIG. 17 now shows an example of a flap 31 arranged between a first container 9a and a second container 9b and pivotable about a rotation axis 30. This way, a good 23n inadvertently dropped from the gripping unit 4 can be conveyed into the second container 9b in an aimed manner by elevating the flap 31. In order to achieve this, the flap 31 can have its own pivot drive, or the elevating of the flap 31 is performed by the robot 1a, 1b itself. Advantageously, the good 23n (which is possibly difficult to grip) is not required to be gripped by the gripping unit 4 for this.

It is also conceivable that the flap 31, alternatively or additionally, can be inclined towards the first container 9a. Furthermore, it is conceivable that the flap 31, alternatively or additionally, can be inclined towards a rest position/a clearing place and/or a container that is placed there. Moreover, it is conceivable that the horizontally oriented flap 31 itself forms the clearing place.

At this point, it is noted that the rest surface 29a shown in FIGS. 13 and 14, the rest surface 29b shown in FIGS. 15 and 16 as well as the flap 31 shown in FIG. 17 can also be used in a robot system 2a, 2b according to FIGS. 1 and 2 as well as in a storage and order-picking system 12 according to FIG. 3. Additionally, it is of course also possible that the rest surface 29a, 29b extends around the containers 9a . . . 9d and surrounds them, so that the risk of a good 23a . . . 23n falling on the floor is even smaller.

The function of the arrangements shown in the figures is now explained in detail below:

FIGS. 1 and 2 show the process when transferring goods 23a . . . 23n from a first goods carrier 9a (source container) into a second goods carrier 9b (target container) using the gripping unit 4. The goods carriers 9a and 9b formed as box-shaped containers are transported to the robot 1a, 1b by the conveying devices 10a and 10b for the transfer operation and transported away from the robot 1a, 1b after the transfer operation. However, the transport of the goods 23a . . . 23n using loading aids 9a and 9b is no necessary requirement, but the goods 23a . . . 23n can also be transported directly on the conveying devices if these, for example, comprise a belt conveyor, an apron conveyor and the like as the first conveying path 10a and a belt conveyor, an apron conveyor and the like as the second conveying path 10b. Of course, roller conveyors 10a and 10b could be provided as well. Likewise, other loading aids such as trays or cardboard boxes, could be provided in place of the containers 9a and 9b.

If in the region of the robot system 2a . . . 2d, loading aids (containers, trays, cardboard boxes) from which or out of which goods 23a . . . 23n are removed by the suction grippers 5, are used as first object carriers 10a, the (source) loading aids can advantageously be loaded with goods 23a . . . 23n of just one type or be loaded in a compartmentalized manner with goods 23a . . . 23n of just one type. For example, a first loading aid contains the good "A", a second loading aid the good "B" and so on. In contrast to this, it is also possible that a loading aid is divided into multiple receiving compartments by means of dividing walls and can accommodate different goods "A", "B", wherein a good "A" can be accommodated in the first receiving compartment and a good "B" can be accommodated in the second receiving compartment.

FIG. 3 shows a fairly more complex arrangement, in specific terms a storage and order-picking system 12. In this regard, goods 23a . . . 23e are delivered to the goods receiving 14, loaded onto the first conveying path 16, transferred from the first conveying path 16 to the second conveying paths 17a and 17b by the robot system 2c and stored in the storage racks 19 by the storage and retrieval units 20a and 20b. The first conveying path 16 in this operation acts as the first goods carrier and/or the source, whereas the second conveying paths 17a and 17b in this operation act as the second goods carrier and/or the target.

When a picking order is to be processed, the goods 23a . . . 23e assigned to the order are retrieved from at least one storage rack 19 using at least one storage and retrieval unit 20a and 20b and transferred to the third conveying path 21. Then, the goods 23a . . . 23e are transported to the robot system 2d using the third conveying path 21 and transferred from the third conveying path 21 to the fourth conveying path 22 by the robot system 2d and are lastly transported to the goods issue 15 using the fourth conveying path 22. The third conveying path 21 in this operation acts as the first goods carrier and/or the source, whereas the fourth conveying path 22 in this operation act as the second goods carrier and/or the target.

As can be seen from FIG. 3, the goods 23a, 23b and 23e are transported directly on the conveying paths 16, 17a, 17b, 21 and 22 acting as goods carriers, whereas the goods 23c and 23d are transported using loading aids 9c . . . 9e, which accordingly also act as goods carriers. Thus, FIG. 3 shows a mixed type of transport. It would certainly also be conceivable that the goods 23a . . . 23e are transported solely on the conveying paths 16, 17a, 17b, 21 and 22 acting as goods carriers or solely using the loading aids 9c . . . 9e.

Of course, the design and arrangement of the conveying paths 16, 17a, 17b, 21 and 22 in FIG. 3 is to be considered only illustrative and other arrangements of the mentioned conveying paths 16, 17a, 17b, 21 and 22 are also conceivable. In particular, an annular conveying path could be arranged at the goods receiving 14, or linear conveying paths could be provided at the goods issue 15. The connection of the robot system 2c and 2d to the goods receiving 14, to the storage area 18 and to the goods issue 15 is not necessarily established via stationary conveying devices, as shown in FIG. 3, but could also take place in whole or in part via autonomous transport vehicles (in particular autonomous floor conveyors), whose loading platforms then also serve as goods carriers.

It would further be conceivable that the goods 23a . . . 23e are transferred directly onto the storage and retrieval units 20a and 20b by the robot system 2c or are transferred directly from the storage and retrieval units 20a and 20b by the robot system 2d. In this case, the loading platforms of the storage and retrieval units 20a and 20b also serve as goods carriers.

At this point, it should also be noted that the robots 1a and 1b do not necessarily have to be designed as jointed-arm robots, but can also be designed for example as gantry robots.

It should also be noted that the goods 23a . . . 23n may be arranged in or on the first goods carrier 9a, 9c, 9e, 10a, 16, 21 next to each other, on top of each other, standing upright or lying, thus disordered (chaotic) and/or in a random arrangement.

It should further be noted that the sensor system can not only comprise cameras 8a . . . 8e, but alternatively or additionally also a room depth sensor, a laser scanner and/or an ultrasonic sensor. Using these sensors, in particular, a three-dimensional image of the goods 23a . . . 23n lying in or on a goods carrier (for example in the containers 9a . . . 9e or on the conveying paths 10a and 10b) can be detected.

In general, by the three-dimensional detection a surface structure of the goods 23a . . . 23n can be detected and the suitability for gripping by means of the suction grippers 5 can be determined. For example, highly convex surfaces are less suitable for gripping, whereas plane surfaces are particularly well grippable.

Generally, a check on whether a good 23a . . . 23n protrudes beyond the loading space 27a . . . 27d (see FIGS. 4 to 12) is performed during the above-described processes in a robot system 2a, 2b or in the storage and order-picking system 12, after the gripping of a good 23a . . . 23n from or out of the first goods carrier 9a by the gripping unit 4. If the outcome of the check is positive, the good 23a . . . 23n protruding beyond the loading space 27a . . . 27d can, in a further step, be gripped by the gripping unit 4 and be placed at a different position (case a). This different position can be located, in particular, in the loading space 27a . . . 27d of the loading aid 9a, from which the good 23a . . . 23n in question was gripped. The different position can, however, also be located within the loading space 27a . . . 27d of another loading aid 9b. Finally, it is also possible to place the good 23a . . . 23n at a different position outside of a loading space 27a . . . 27d of a loading aid 9a, 9b, for example, at a clearing place. Alternatively, it is also possible to move the part of the good 23a . . . 23n that is protruding beyond the loading space 27a . . . 27d back into the loading space 27a . . . 27d by the gripping unit 4 (case b).

The outcome of the check can be positive, particularly if a good 23a . . . 23n inadvertently falls off the gripping unit 4, or a position calculated for the good 23a . . . 23n for placing or throwing on the second goods carrier 9b proves to not be reached.

In the above procedures, it is particularly conceivable that the check on whether a good 23a . . . 23n protrudes beyond a loading space 27a . . . 27d as well as the step a) or step b) are repeated recursively until the outcome of the check is negative. In the course of this, it is assumed that the robot system 2a . . . 2d is principally able to rectify errors that have occurred.

However, it would also be particularly conceivable that the check on whether a good 23a . . . 23n protrudes beyond a loading space 27a . . . 27d as well as the step a) or step b) are repeated recursively and the recursive repetition of this procedure is canceled after a predefined number of repetitions and an alarm message is generated. In this variant, an operator is involved, if necessary, to solve the problem that has occurred.

Generally, the inadvertent dropping of a good 23a . . . 23n can be detected by monitoring an occupied status of the gripping unit 4 after the gripping of a good 23a . . . 23n. The unwanted dropping of a good 23a . . . 23n is characterized in that the gripping unit 4 is unoccupied but activated. Consequently, the check on whether a good 23a . . . 23n protrudes beyond a loading space 27a . . . 27d is initiated. In the event that the gripping unit 4, however, is occupied and activated, a good 23a . . . 23n is held by the gripping unit 4. In the event that the gripping unit 4 is unoccupied and deactivated, a good 23a . . . 23n was placed or dropped deliberately and/or intentionally. The monitoring of the occupied status of the gripping unit 4 can, for example, be carried out by a sensor system on the gripping unit 4, which sensor system is specifically designed for this (not depicted). The monitoring of the occupied status of the gripping unit 4 can, however, also be carried out by the sensor system 8a . . . 8e which is provided for detecting the loading space 27a . . . 27d and the goods 23a . . . 23n located in the region of the loading space 27a . . . 27d (i. e. in the example with the cameras 8a . . . 8e shown in FIGS. 1 and 2).

Furthermore, it is favorable if the check on whether a good 23a . . . 23n protrudes beyond a loading space 27a . . . 27d takes place after the gripping unit 4 and/or the good 23a . . . 23n gripped by the gripping unit 4 has been completely moved out of the loading space 27a . . . 27d. If the check takes place after the good 23a . . . 23n has been gripped, the gripping unit 4 including the good 23a . . . 23n held therewith should therefore have been completely moved out of the loading space 27a . . . 27d before the check. If the check takes place after the good 23a . . . 23n has been placed, only the gripping unit 4 (which now does not hold any more goods 23a . . . 23n) has to have been moved out of the loading space 27a . . . 27d before the check. Furthermore, it is advantageous if the check on whether a good 23a . . . 23n protrudes beyond the loading space 27a . . . 27d takes place after the gripping unit 4 and/or the good 23a . . . 23n gripped by the gripping unit 4 has been completely moved out of a detection region of the sensor system 8a . . . 8e. Moreover, it is advantageous if the check on whether a good 23a . . . 23n protrudes beyond the loading space 27a . . . 27d takes place after completely moving the gripping unit 4 and the good 23a . . . 23n gripped by the gripping unit 4 laterally away from a goods carrier 9a . . . 9d, 10a, 10b, 16, 17a, 17b, 21, 22. These measures ensure that a static condition ensues in the loading space 27a . . . 27d, which condition is not disturbed by the transfer operation of the goods 23a . . . 23n. Accordingly, this also ensures that the check on whether a good 23a . . . 23n protrudes beyond the loading space 27a . . . 27d is valid.

Moreover, it is favorable if the check on whether a good 23a . . . 23n protrudes beyond the loading space 27a . . . 27d is performed after each gripping of a good 23a . . . 23n. This allows to detect a good 23a . . . 23n protruding beyond the loading space 27a . . . 27d within a narrow time frame of the occurrence of the error, and the accumulation of the impacts of multiple errors occurring consecutively is avoided. The aforementioned measures relate particularly to the first goods carrier 9a (source).

Similarly, it is favorable if the check on whether a good 23a . . . 23n protrudes beyond the loading space 27a . . . 27d is performed after each placing of a good 23a . . . 23n in or on the second goods carrier 9b. This allows to detect a good 23a . . . 23n protruding beyond the loading space 27a . . . 27d also within a narrow time frame of the occurrence of the error, and the accumulation of the impacts of multiple errors occurring consecutively is again avoided. These measures relate particularly to the second goods carrier 9b (target).

Finally, it is also advantageous of the check on whether a good 23a . . . 23n protrudes beyond a loading space 27a . . . 27d is performed after the placing of a plurality of goods 23a . . . 23n (in particular, after the placing of all goods 23a . . . 23n associated with an order) in or on the second goods carrier 9b. This allows to reduce the number of checks and thereby the computing effort and the computation time for them. This variant is therefore particularly suitable for robot systems 2a . . . 2d with a limited computational power.

Generally, a check can take place after the gripping of the good 23a . . . 23n (but before placing the same) and a further check can take place after placing the good 23a . . . 23n. However, it is also conceivable that only one check takes place after placing the good 23a . . . 23n (and therefore, chronologically after the gripping of the good 23a . . . 23n).

It is also favorable if the check on whether a good 23a . . . 23n protrudes beyond the loading space 7a . . . 7d takes place after gripping a different good 23a . . . 23n from or out of the first goods carrier 9a. This variant relates to two cases in particular, namely if a different good 23a . . . 23n than the one that has been gripped is dropped back into or onto the first goods carrier 9a, or if the gripping unit 4 has placed a good 23a . . . 23n in or on the second goods carrier 9b, but prevents an optical detection of the second goods carrier 9b and the goods 23a . . . 23n stored therein. In the first case, a good 23a . . . 23n different from the one gripped is inadvertently pulled along and can consequently protrude beyond the loading space 17a . . . 17d of the first goods carrier 9a. In the second case, a detection (particularly, an optical detection) of the second goods carrier 9b and the goods 23a . . . 23n stored therein can take place only once the gripping unit 4 is moved out of the region of the second goods carrier 9b.

The check on whether a good 23a . . . 23n protrudes beyond the loading space 7a . . . 7d can generally take place during the movement of the gripping unit 4 from the first goods carrier 9a to the second goods carrier 9b and vice versa, so that no noticeable waiting periods are caused by the check. Loading aids can therefore be transported away immediately after the repacking or order-picking operation by the conveying device 10a, 10b.

In a particularly advantageous variant
the gripping of a good 23a . . . 23n from or out of the first goods carrier 9a and a detection of the second goods carrier 9b and the goods 23a . . . 23n located in or on the second goods carrier 9b using the sensor system 8a . . . 8e, and
the placing of a good 23a . . . 23n in or on the second goods carrier 9b and a detection of the first goods carrier 9a or the goods 23a . . . 23n located in or on the first goods carrier 9a using the sensor system 8a . . . 8e
takes place in alternation.

This variant can be explained particularly well by reference to the robot system 1a of FIG. 1:

In a first period of time, a good 23a . . . 23n is gripped from the first goods carrier 9a.

In a second period of time, the good 23a . . . 23n is placed in the second goods carrier 9b. If necessary, a correction also takes place regarding goods 23a . . . 23n protruding beyond the loading space 7a . . . 7d of the second goods carrier 9b, according to case a) or case b). Additionally, in the second period of time, the first goods carrier 9a including the goods 23a . . . 23n stored therein is detected by the camera 8a.

In a third period of time, the gripping unit 4 moved back to the first goods carrier 9a and grips a further good 23a . . . 23n from the first goods carrier 9a. If necessary, a correction takes place regarding goods 23a . . . 23n protruding beyond the loading space 7a . . . 7d of the first goods carrier 9a, according to case a) or case b). Additionally, in the third period of time, the second goods carrier 9b including the goods 23a . . . 23n stored therein is detected by the camera 8b.

In a fourth period of time, the good 23a . . . 23n is placed in the second goods carrier 9b. If necessary, a correction takes place, yet again, regarding goods 23a . . . 23n protruding beyond the loading space 7a . . . 7d of the second goods carrier 9b, according to case a) or case b). Additionally, in the fourth period of time, the first goods carrier 9a including the goods 23a . . . 23n stored therein is detected by the camera 8a.

As a consequence, the procedures described for the even periods of time and odd periods of time are repeated as often as desired.

The camera image of the first goods carrier 9a including the goods 23a . . . 23n stored therein captured in the second period of time forms the basis for gripping a good 23a . . . 23n and the correction regarding a good 23a . . . 23n protruding beyond the loading space 7a . . . 7d of the first goods carrier 9a in the third period of time. The camera image of the second goods carrier 9b including the goods 23a . . . 23n stored therein captured in the third period of time forms the basis for placing a good 23a . . . 23n and the correction regarding a good 23a . . . 23n protruding beyond the loading space 7a . . . 7d of the second goods carrier 9b in the fourth period of time. The procedures taking place in the odd periods of time and in the even periods of time therefore are repeated "in alternation". As an addition, it is noted that the periods of time can be fully separate of each other but can also overlap temporally.

The above variant has been explained with reference to the robot system 2a. Naturally, however, it also unrestrictedly applies to the robot system 2b of FIG. 2 or to the storage and order-picking system 12 of FIG. 3.

By means of the proposed measures, a good 23a . . . 23n protruding beyond the loading space 27a . . . 27d of a loading aid 9a . . . 9e is recognized, whereby faults in conveying and manipulating in a storage and order-picking system 12 can be avoided, for instance if the loading aids 9a . . . 9e, during their transport, pass regions having a low vertical clearance, or if the loading aids 9a . . . 9e are subjected to high accelerations and/or vibrations and goods 23a . . . 23n protruding beyond a loading space 27a . . . 27d could fall out of or from the loading aid 9a . . . 9e. Therefore, the availability of a storage and order-picking system 12 is increased by means of the proposed measures. Additionally, the performance of the storage and order-picking system 12 can be significantly increased as compared to the prior art by the loading aids 9a . . . 9e that can be loaded up to a container edge and/or even beyond that. Therefore, they also require less installation space than has been the case to date.

Finally, it should also be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that the devices shown may in reality comprise more or less components than those shown. In some cases, the shown devices and/or their components may not be depicted to scale and/or be enlarged and/or reduced in size.

LIST OF REFERENCE NUMBERS 1a, 1b robot
2a . . . 2d robot system
3 robot base
4 gripping unit
5 suction gripper
6 first robot arm segment
7 second robot arm segment
8a . . . 8e camera (sensor system)
9a . . . 9e container (goods carrier)
10a, 10b conveying device (goods carrier)
11 controller
12 storage and order-picking system
13 building wall
14 goods receiving
15 goods issue
16 first conveying path (goods carrier)
17a, 17b second conveying path (goods carrier)
18 storage area
19 storage rack
20a, 20b storage and retrieval unit
21 third conveying path (goods carrier)
22 fourth conveying path (goods carrier)
23a . . . 23n good(s)
24 bottom
25 side wall
26 loading opening
27a-27d loading space
28 plane of the loading opening
29a, 29b rest surface
30 rotation axis
31 flap

The invention claimed is:

1. A method for controlling a robot in a storage and order-picking system, the robot comprising a gripping unit movable in relation to a robot base, the method comprising the steps:
   gripping the goods from or out of a first loading aid, which is suitable for the transport of the goods, and placing the goods in or on a second loading aid, which is suitable for the transport of the goods, by the gripping unit,
   providing a first loading space assigned to the first loading aid and providing a second loading space assigned to the second loading aid, the first loading space and the second loading space each being intended for accommodating the goods,
   detecting the first loading space and the goods located within the first loading space by a sensor system, and
   after the gripping of a first good of the goods, checking whether a second good of the goods other than the first good so gripped is unintentionally taken along or pulled along when moving the gripping unit out of the first loading aid and protrudes beyond the first loading space, and
   a) the second good protruding beyond the first loading space is gripped by the gripping unit and placed at a different position, or
   b) the part of the second good protruding beyond the first loading space is moved into the first loading space by the gripping unit,
   if the outcome of a check is positive.

2. The method according to claim 1, the method further comprising the step:
   for placing the first good in or on the second loading aid, calculating a position within the second loading space, at which the first good likely does not protrude beyond the second loading space.

3. The method according to claim 1, the method further comprising:
   checking whether a good dropped from the gripping unit is located completely outside the one of the first loading space and the second loading space.

4. The method according to claim 3, wherein
   a check is conducted on whether the good that was dropped from the gripping unit is located on a rest surface which is arranged to be adjacent to at least one of the first loading aid and the second loading aid, and the good located on the rest surface is gripped by the gripping unit and is placed
i) in or on the first loading aid, or
ii) in or on the second loading aid, or
iii) at a clearing place.

5. The method according to claim 3, wherein a check is conducted on whether the good dropped from the gripping unit has dropped on the floor.

6. The method according to claim 1, wherein the check on whether the second good protrudes beyond the first loading space, as well as the step a) or step b) are repeated recursively until the outcome of the check is negative.

7. The method according to claim 1, wherein the check on whether the second good protrudes beyond the first loading space, as well as the step a) or step b) are repeated recursively, and the recursive repetition of this procedure is canceled after a predefined number of repetitions, and an alarm message is issued.

8. The method according to claim 1, wherein the check on whether the second good protrudes beyond the first loading space takes place after gripping a different good from or out of the first loading aid.

9. The method according to claim 1, wherein the check on whether the second good protrudes beyond the first loading space takes place after the gripping unit and/or the first good gripped by the gripping unit has been completely moved out of the first loading space.

10. The method according to claim 1, wherein the check on whether the second good protrudes beyond the first loading space takes place after the gripping unit and/or the first good gripped by the gripping unit has been completely moved out of a detection region of the sensor system.

11. The method according to claim 1, wherein the check on whether the second good protrudes beyond the first loading space takes place after completely moving the gripping unit and the first good gripped by the gripping unit laterally away from the first loading aid.

12. The method according to claim 1, wherein the check on whether the second good protrudes beyond the first loading space is performed after each gripping of a good.

13. The method according to claim 1, wherein the check on whether the second good protrudes beyond the first loading space is performed after each placing of a good in or on the second loading aid.

14. The method according to claim 1, wherein the check on whether the second good protrudes beyond the first loading space takes place after placing a plurality of goods in or on the second loading aid.

15. The method according to claim 1, wherein an occupied status of the gripping unit after the gripping of the first good is monitored and the check on whether a good protrudes beyond the first loading space is performed upon recognition of an unoccupied but activated gripping unit.

16. The method according to claim 1, wherein, according to an order, the goods
are transported to the robot by the first loading aid,
are transferred from or out of the first loading aid into or onto the second loading aid, and
are transported away from the robot by the second loading aid.

17. The method according to claim 1, wherein the first and second loading aids each comprises a bottom, side walls rising up from the bottom and a loading opening bounded by the side walls.

18. The method according to claim 17, wherein the first loading space and the second loading space are each bounded towards the top by the loading opening.

19. The method according to claim 17, wherein the first loading space and the second loading space are each defined to encompass a good in the first and second loading aids, respectively, that protrudes upwards past a container edge within a predetermined threshold distance of the container edge.

20. The method according to claim 19, wherein the first loading space and the second loading space are each defined to encompass a good in the loading aids, respectively, that protrudes laterally past a container edge within a predetermined threshold amount defining a plane of the loading opening parallel to the side walls of the respective first and second loading aid.

21. The method according to claim 20, wherein the first loading space and the second loading space are each defined to encompass a good in the loading aids, respectively, that hangs downwards below the plane a predetermined distance of the loading opening.

22. The method according to claim 1, wherein the first good and the second good are plastic bags.

23. The method according to claim 1, wherein the different position according to step a) is arranged in the first loading space of the first loading aid, and wherein the second good protruding beyond the first loading space is completely returned into the first loading space.

24. The method according to claim 1,
wherein the different position according to step a) is arranged in one of the first loading space of the first loading aid and the second loading space of the second loading aid, and
wherein the second good protruding beyond the first loading space
is placed in the second loading space of the second loading aid, if the second good is required to complete an order comprising the first good and the second good, or
is completely returned into the first loading space of the first loading aid, if the second good is not required to complete an order comprising only the first good from the first loading aid.

25. The method according to claim 1, wherein additionally both after the gripping of the first good from or out of the first loading aid by the gripping unit and after the placing of the first good in or on the second loading aid by the gripping unit, detecting the second loading space and the goods located within the second loading space by the sensor system, and checking whether the first good protrudes beyond one of the first loading space and the second loading space, and
a) the first good protruding beyond the one of the first loading space and the second loading space is gripped by the gripping unit and placed at a different position, or
b) the part of the first good protruding beyond the one of the first loading space and the second loading space is moved into the one of the first loading space and the second loading space by the gripping unit,
if the outcome of a check is positive.

26. The method according to claim 1, wherein
a first group of actions comprises the gripping of the first good from or out of the first loading aid by the gripping unit and a detecting of the second loading space and the goods located within the second loading space by the sensor system,
a second group of actions comprises the placing of the first good in or on the second loading aid by the gripping unit and the detecting of the first loading space and the goods located within the first loading space by the sensor system, and the first group of actions occurs in each of a plurality of first time periods and the second group of actions occurs in each of a plurality of second time periods different from and alternating with the first time periods.

27. The method according to claim 26, wherein the first group of actions further comprises a correction regarding the second good protruding beyond the first loading space according to step a) or step b) and the second group of actions further comprises a correction regarding the first good protruding beyond the second loading space, the correction regarding the second good protruding beyond the first loading space according to step a) or step b) in one of the first time periods is based upon a previous detection of the first loading space in one of the second time periods preceding the one of the first time periods, and the correction regarding the first good protruding beyond the second loading space in one of the second time periods is based upon a previous detection of the second loading space in one of the first time periods preceding the one of the second time periods.

28. A robot system, comprising a robot having a gripping unit movable in relation to a robot base and designed for gripping goods from or out of a first loading aid and placing the goods in or on a second loading aid by the gripping unit, wherein the first and second loading aids each is suitable for the transport of the goods, wherein a first loading space is assigned to the first loading aid and a second loading space is assigned to the second loading aid and wherein the first loading space and the second loading space are each intended for accommodating the goods and are located within the operating range of the robot, a sensor system for detecting a first loading space assigned to the first loading aid, and a controller configured to check, after the gripping of a first good from or out of the first loading aid by the gripping unit, whether a second good of the goods other than the first good so gripped is unintentionally taken along or pulled along when moving the gripping unit out of the first loading aid and protrudes beyond the first loading space and to command, upon a positive outcome of the check, the robot to a) grip the second good protruding beyond the first loading space and to place it at a different position, or b) move the part of the second good that is protruding beyond the first loading space into the first loading space.

29. The robot system according to claim 28, wherein the sensor system comprises a camera and/or a room depth sensor and/or a laser scanner and/or an ultrasonic sensor.

30. The robot system according to claim 28, wherein the gripping unit comprises at least one suction gripper.

31. The robot system according to claim 28, wherein the robot is designed as a jointed-arm robot or a gantry robot.

32. A storage and order-picking system for order-picking of goods, comprising a storage area for storing goods and a working area for picking/repacking goods using the robot system according to claim 28.

33. The storage and order-picking system according to claim 32, further comprising:

a first conveying device for transporting goods in or on the first loading aid to the robot and away from the robot, and a second conveying device for transporting goods in or on the second loading aid to the robot and away from the robot, wherein the robot is arranged in the working area and designed for gripping at least one good from or out of the first loading aid for an order and to place the at least one good in or on the second loading aid for this order, and wherein the working area is designed for the fully automated order-picking of goods.

34. The robot system according to claim 28, wherein the controller additionally being configured to trigger a first group of actions in each of a plurality of first time periods and a second group of actions in each of a plurality of second time periods different from and alternating with the first time periods, wherein the first group of actions comprises the gripping of the first good from or out of the first loading aid by the gripping unit and a detecting of the second loading space and the goods located within the region of the second loading space by the sensor system, and the second group of actions comprises the placing of the first good in or on the second loading aid by the gripping unit and the detecting of the first loading space and the goods located within the region of the first loading space by the sensor system.

35. The robot system according to claim 34, wherein the first group of actions further comprises a correction regarding the second good protruding beyond the first loading space according to step a) or step b) and the second group of actions further comprises a correction regarding the first good protruding beyond the second loading space, the correction regarding the second good protruding beyond the first loading space according to step a) or step b) in one of the first time periods is based upon a previous detection of the first loading space in one of the second time periods preceding the one of the first time periods, and the correction regarding the first good protruding beyond the second loading space in one of the second time periods is based upon a previous detection of the second loading space in one of the first time periods preceding the one of the second time periods.

* * * * *